(12) United States Patent
Ishikawa

(10) Patent No.: US 6,875,994 B2
(45) Date of Patent: Apr. 5, 2005

(54) RADIATION IMAGE READ-OUT APPARATUS

(75) Inventor: Hiromi Ishikawa, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 266 days.

(21) Appl. No.: 10/193,994

(22) Filed: Jul. 15, 2002

(65) Prior Publication Data
US 2003/0010945 A1 Jan. 16, 2003

(30) Foreign Application Priority Data

Jul. 13, 2001 (JP) .................................... 2001-213060

(51) Int. Cl.$^7$ ............................................. G03B 42/08
(52) U.S. Cl. ...................... 250/585; 250/581; 250/582; 250/584; 250/586
(58) Field of Search ................................ 250/585, 581, 250/582, 584, 586; 347/244, 258; 359/205, 206, 207

(56) References Cited

U.S. PATENT DOCUMENTS

| | | | |
|---|---|---|---|
| 4,258,264 A | | 3/1981 | Kotera et al. |
| 4,346,295 A | | 8/1982 | Tanaka et al. |
| 4,485,302 A | | 11/1984 | Tanaka et al. |
| 5,340,995 A | * | 8/1994 | Verbeke et al. ............. 250/581 |
| 5,673,137 A | * | 9/1997 | Shimada et al. ........... 359/206 |
| 6,495,849 B2 | * | 12/2002 | Yasuda ....................... 250/584 |
| 2002/0053648 A1 | * | 5/2002 | Karasawa ................... 250/586 |

FOREIGN PATENT DOCUMENTS

| | | |
|---|---|---|
| JP | 55-12429 | 1/1980 |
| JP | 56-11395 | 2/1981 |
| JP | 56-11397 | 2/1982 |

* cited by examiner

*Primary Examiner*—Constantine Hannaher
*Assistant Examiner*—Shun Lee
(74) *Attorney, Agent, or Firm*—Sughrue Mion, PLLC

(57) ABSTRACT

A radiation image read-out apparatus for reading out a radiation image recorded on a stimulable phosphor sheet includes a stimulating light projector which projects stimulating light emitted from a stimulating light source onto the stimulable phosphor sheet through a projecting optical system so that the stimulating light is collected in a line-like area of the stimulable phosphor sheet, and a line sensor which detects stimulated emission emitted from the line-like area of the stimulable phosphor sheet upon exposure to the stimulating light. The projecting optical system has an aspheric toric surface.

8 Claims, 5 Drawing Sheets

RADIATION IMAGE READ-OUT APPARATUS

BACKGROUND OF THE INVENTION

1. Field of the Invention

This invention relates to a radiation image read-out apparatus, and more particularly to a radiation image read-out apparatus for reading out a radiation image stored on a stimulable phosphor sheet by detecting stimulated emission emitted from the stimulable phosphor sheet upon exposure to stimulating light by the use of a line sensor.

2. Description of the Related Art

When certain kinds of phosphor are exposed to a radiation such as X-rays, α-rays, β-rays, γ-rays, electron beams, ultraviolet rays and the like, they store a part of energy of the radiation. Then when the phosphor which has been exposed to the radiation is exposed to stimulating light such as visible light, light is emitted from the phosphor in proportion to the stored energy of the radiation. A phosphor exhibiting such properties is generally referred to as "a stimulable phosphor". In this specification, the light emitted from the stimulable phosphor upon stimulation thereof will be referred to as "stimulated emission". There has been known a radiation image recording and reproducing system in which a stimulable phosphor sheet (a sheet provided with a layer of the stimulable phosphor) is exposed to a radiation passing through an object such as a human body to have a radiation image of the object stored on the stimulable phosphor sheet as a latent image, stimulating light such as a laser beam is projected onto the stimulable phosphor sheet, and the stimulated emission emitted from the stimulable phosphor sheet is photoelectrically detected, thereby obtaining an image signal (a radiation image signal) representing a radiation image of the object. See, for instance, Japanese Unexamined Patent Publication Nos. 55(1980)-12429, 56(1981)-11395 and 56(1981)-11397.

As a system for detecting stimulated emission emitted from the stimulable phosphor sheet, there has been known a system in which stimulating light which is emitted from a stimulating light source as a divergent light bundle is converged on a line-like area on the surface of the stimulable phosphor sheet by a cylindrical lens and stimulated emission emitted from the line-like area of the stimulable phosphor sheet is detected by a line sensor comprising a plurality of linearly arranged photoelectric convertor elements.

However, in the case where the stimulating light is converged on a line-like area of the stimulable phosphor sheet (e.g., of a width not wider than 50 μm) by the use of a cylindrical lens, there is a fear that the line-like area becomes wider than a desired width or nonuniform in width due to false spherical aberration or false curvature of field of the cylindrical lens. An attempt to correct false spherical aberration and/or false curvature of field of the cylindrical lens to precisely converge the stimulating light on the line-like area by adding, for instance, a spherical lens increases the optical path length and increases the overall size of the apparatus.

The "false spherical aberration" means a stimulating light collecting error in a plane normal to the longitudinal direction of the cylindrical lens (the direction in which the cylindrical lens extends), that is, a plane in which the lens has refractive power, and the "false curvature of field" means an error in positioning of focal points on which the stimulating light is to be collected and which is to be arranged in the plane of refractive power along the longitudinal direction of the cylindrical lens, where the focal points are arranged on an arcuate line curving along the longitudinal direction of the cylindrical lens.

SUMMARY OF THE INVENTION

In view of the foregoing observations and description, the primary object of the present invention is to provide a radiation image read-out apparatus in which the stimulating light can be precisely converged on a desired line-like area on the stimulable phosphor sheet without increasing the overall size of the apparatus.

In accordance with a first aspect of the present invention, there is provided a radiation image read-out apparatus for reading out a radiation image recorded on a stimulable phosphor sheet comprising a stimulating light projecting means which projects stimulating light emitted from a stimulating light source onto the stimulable phosphor sheet through a projecting optical system so that the stimulating light is collected in a line-like area of the stimulable phosphor sheet and a line sensor which detects stimulated emission emitted from the line-like area of the stimulable phosphor sheet upon exposure to the stimulating light, wherein the improvement comprises that the projecting optical system has an aspheric toric surface.

For example, the stimulating light projecting means may comprise a plurality of pairs of the stimulating light source and the projecting optical system arranged along the longitudinal direction of said line-like area.

In this case, it is preferred that the pairs of the stimulating light source and the projecting optical system be arranged so that line-like areas in which the stimulating light emitted from the respective stimulating light sources is collected through the corresponding projecting optical systems at least partly overlap each other.

In the radiation image read-out apparatus of this invention, the aspheric toric surface of the projecting optical system contributes to correction of error in collecting the stimulating light in the line-like area due to false spherical aberration and/or false curvature of field without increasing the optical path length, whereby the stimulating light can be precisely converged on a desired line-like area on the stimulable phosphor sheet without increasing the overall size of the apparatus.

Further, when the stimulating light projecting means comprises a plurality of pairs of the stimulating light source and the projecting optical system arranged along the longitudinal direction of said line-like area, the optical path length from the stimulating light source to the stimulable phosphor sheet is further shortened, whereby the overall size of the radiation image read-out apparatus can be further reduced.

Further, when the pairs of the stimulating light source and the projecting optical system are arranged so that line-like areas in which the stimulating light emitted from the respective stimulating light sources is collected through the corresponding projecting optical systems are at least partly overlap each other, the intensity of the stimulating light collected in the line-like area on the stimulable phosphor sheet can be more uniform for the following. That is, when stimulating light is collected in the line-like area by a single pair of stimulating light source and projecting optical system, the intensity of the stimulating light is high at the middle of the line-like area as seen in the longitudinal direction thereof and low at the end portions thereof. Accordingly, when the line-like area on the stimulable phosphor sheet is formed by a plurality of small line-like areas each of which is illuminated by a single pair of stimulating light source and projecting optical system and which partly overlaps each other, the end portions of the small line-like areas overlap each other and the intensity of the stimulating light at the end portions is increased, whereby the line-like area formed by a plurality of small line-like areas can be more uniform in intensity of the stimulating light.

DESCRIPTION OF THE PREFERRED EMBODIMENT

Figure 1:
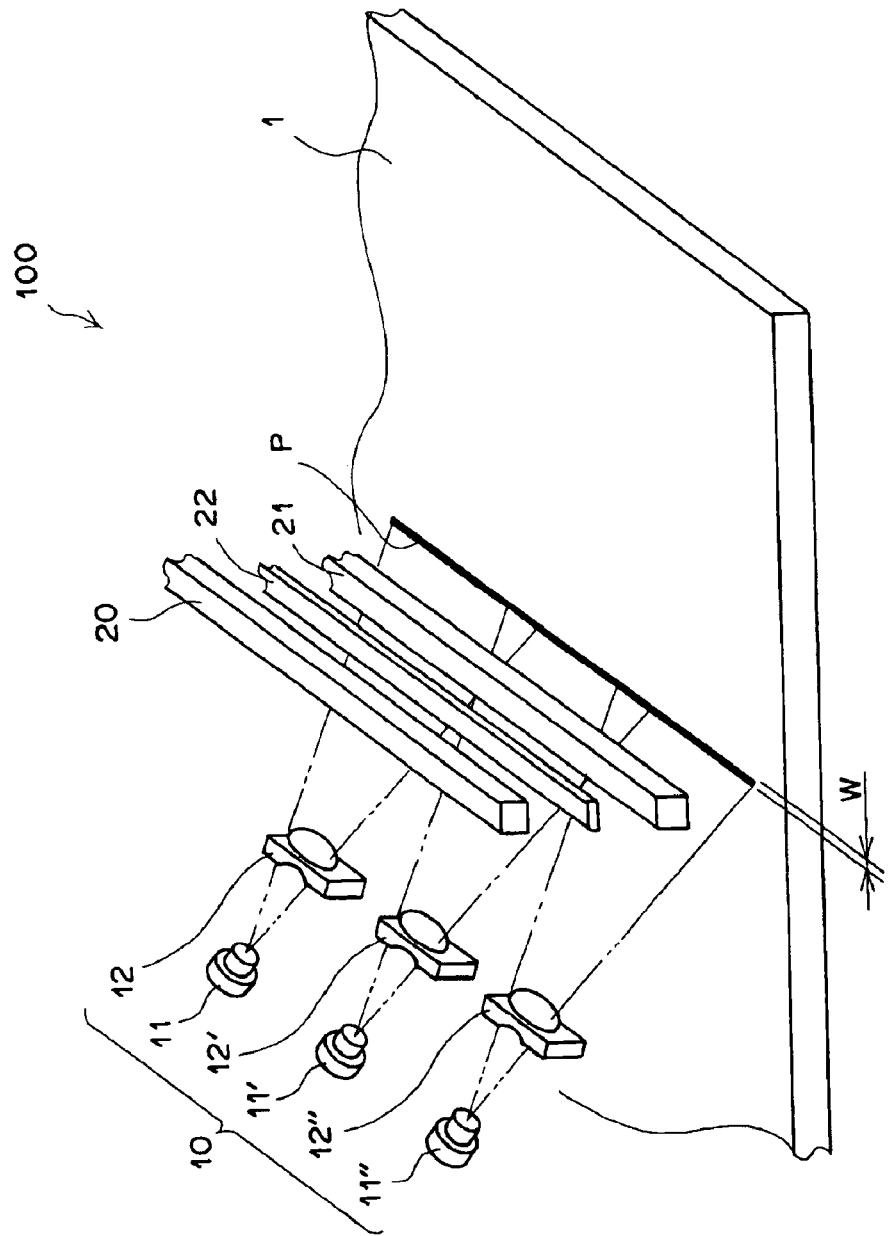
FIG. 1 is a perspective view schematically showing a radiation image read-out apparatus in accordance with a first embodiment of the present invention.

As shown in FIG. 1, a radiation image read-out apparatus 100 in accordance with a first embodiment of the present invention comprises a stimulating light projecting means 10 which projects stimulating light emitted from a plurality of semiconductor lasers 11 onto a stimulable phosphor sheet 1 through a plurality of aspheric toric lenses 12 so that the stimulating light is collected in a line-like area P on the stimulable phosphor sheet 1, and a line sensor 20 which detects stimulated emission emitted from the line-like area P of the stimulable phosphor sheet 1 upon exposure to the stimulating light and reads out a radiation image recorded on the stimulable phosphor sheet 1.

Figure 4:
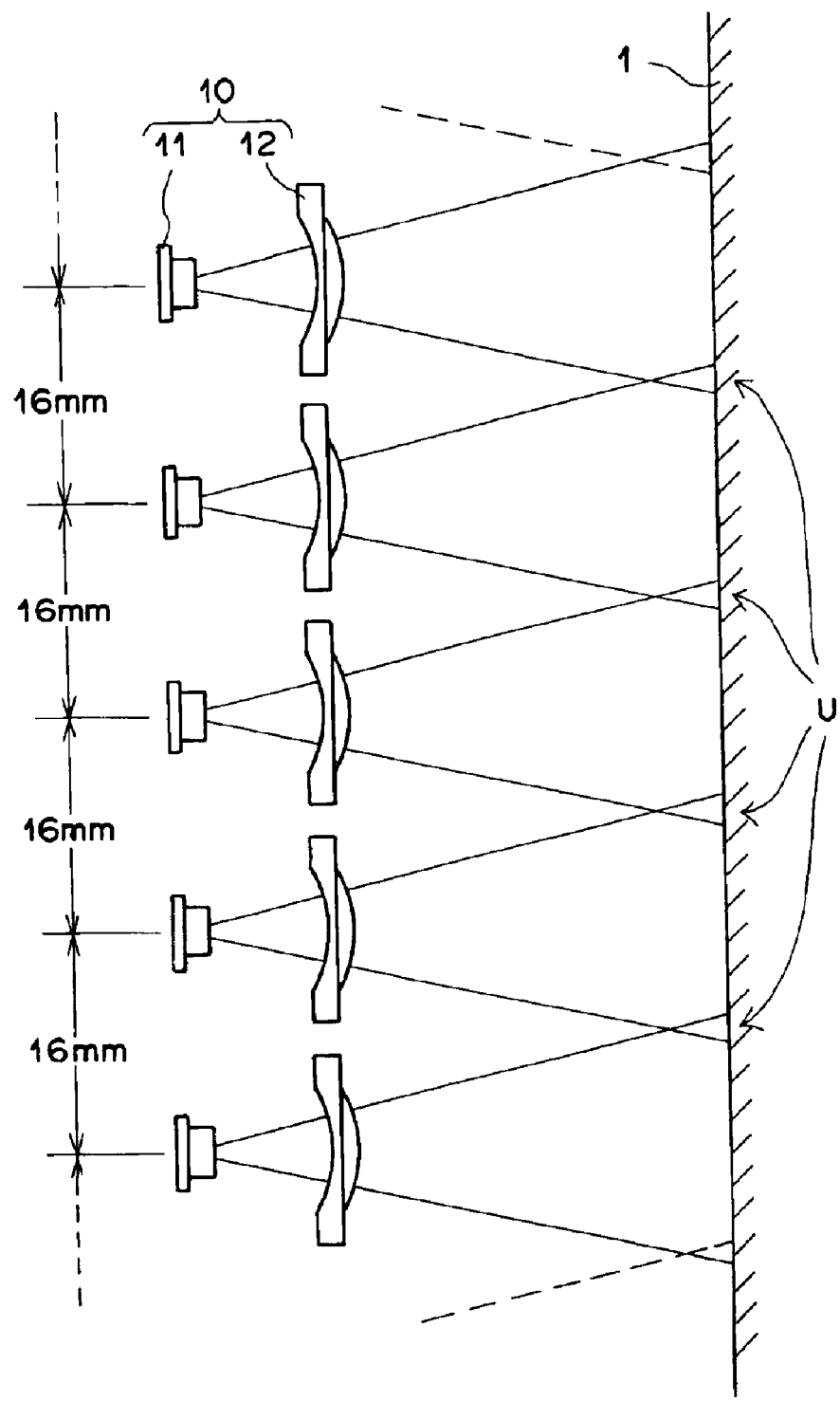
FIG. 4 is a plan view schematically showing a stimulating light projecting means comprising a plurality of pairs of stimulating light source and projecting optical system.

That is, the stimulating light projecting means 10 comprises a plurality of pairs of the semiconductor laser 11 and the aspheric toric lens 12 arranged along the longitudinal direction of said line-like area P. The pairs of the semiconductor laser 11 and the aspheric toric lenses 12 are arranged so that line-like areas in which the stimulating light emitted from the respective semiconductor lasers 11 is collected through the corresponding aspheric toric lenses 12 at least partly overlaps each other at overlapping areas U (FIG. 4).

The radiation image read-out apparatus 100 further comprises a refractive index distribution type lens 21 which forms an erected image of the line-like area P in a natural size on the line sensor 20, and a stimulating light cut filter 22 which transmits the stimulated emission but cuts the stimulating light.

Figure 2:
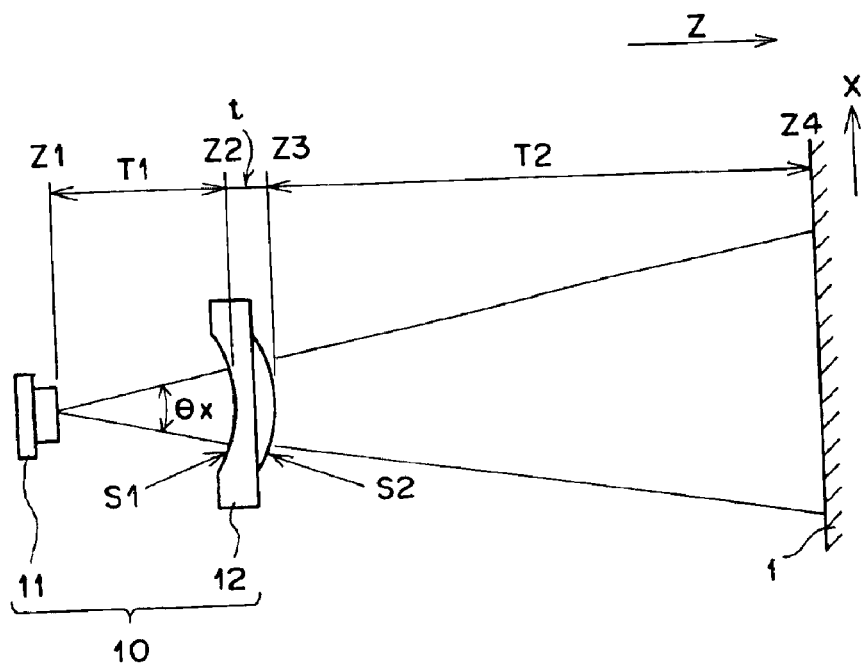
FIG. 2 is a plan view showing a pair of stimulating light source and projecting optical system.
Figure 3:
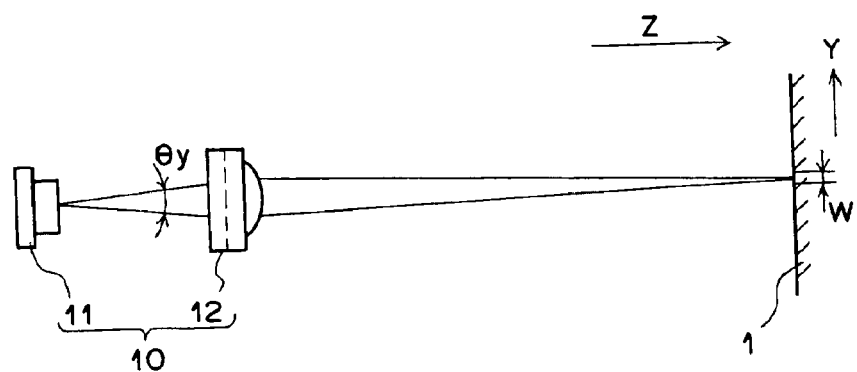
FIG. 3 is a side view showing the pair of stimulating light source and projecting optical system.

An example of specific design values for the pair of semiconductor laser 11 and the aspheric toric lens 12 will be described with reference to FIGS. 2 and 3, hereinbelow.

specification of the semiconductor laser 11: wavelength=660 nm, output power=50 mW, angle of divergence $\theta x=20°$, angle of divergence $\theta y=8.5°$ distance T1 between the position Z1 of the light emitting point and the position Z2 of the vertex of the first face S1 of the lens=4.93 mm central thickness t of the lens=1.8 mm lens material=BK7 profile of the first face S1: Rx=−4.4 mm, Ry=∞ (cylindrical surface)

profile of the second face S2: aspheric toric surface (aspheric-surface-based Y-toroid)

$$Z=CY_2/[1+\text{SQRT}\{1-(1+K)C_2Y_2\}]+AY_4+BY_6+CY_8+DY_{10}$$

C=−1/2.8 (the curvature at the vertex of the surface
K=−0.190505 (the conic coefficient)
A=0.450281E-02
B=−0.212922E-02
C=0.120436E-02
D=−0.220771E-03

The distance T2 between the position Z3 of the vertex of the second face S2 of the lens and the position Z4 of the surface of the stimulable phosphor sheet 1=62.5 mm The width W of the line-like area in which the laser beam is collected (the minor diameter of the beam diameter)=36 μm The stimulating light projecting means 10 comprises 26 pairs of the semiconductor laser 11 and the aspheric toric lens 12 at intervals of 16 mm as shown in FIG. 4.

The stimulating light emitted from the semiconductor lasers 11 is collected in the line-like area P on the stimulable phosphor sheet 1 through the aspheric toric lenses 12. Stimulated emission emitted from the line-like area P of the stimulable phosphor sheet 1 upon exposure to the stimulating light impinges upon the line sensor 20 through the refractive index distribution type lens 21 and the stimulating light cut filter 22 and detected by the line sensor 20. The stimulating light reflected by the stimulable phosphor sheet 1 toward the line sensor 20 is cut by the stimulating light cut filter 22.

Another example of specific design values for the pair of semiconductor laser 11 and the aspheric toric lens 12 will be described, hereinbelow. In this example, the design values are modified so that the optical path length of the stimulating light projecting means is further shortened.

specification of the semiconductor laser: wavelength=660 nm, output power=50 mW, angle of divergence $\theta x=20°$, angle of divergence $\theta y=8.5°$ distance T1 between the position Z1 of the light emitting point and the position Z2 of the vertex of the first face S1 of the lens=3.27 mm central thickness t of the lens=2.0 mm lens material=BK7 profile of the first face S1: Rx=−3.0 mm, Ry=∞ (cylindrical surface)

profile of the second face S2: aspheric toric surface (aspheric-surface-based Y-toroid)

$$Z=CY_2/[1+\text{SQRT}\{1-(1+K)C_2Y_2\}]+AY_4+BY_6+CY_8+DY_{10}$$

C=−1/2.1 (the curvature at the vertex of the surface
K=−0.281248 (the conic coefficient)
A=0.916272E-02
B=−0.913969E-02
C=0.908230E-02
D=−0.303459E-03

The distance T2 between the position Z3 of the vertex of the second face S2 of the lens and the position Z4 of the surface of the stimulable phosphor sheet 1=45.0 mm The width W of the line-like area in which the laser beam is collected (the minor diameter of the beam diameter)=37 μm The stimulating light projecting means 10 comprises 26 pairs of the semiconductor laser 11 and the aspheric toric lens 12 at intervals of 16 mm as shown in FIG. 4.

Figure 5:
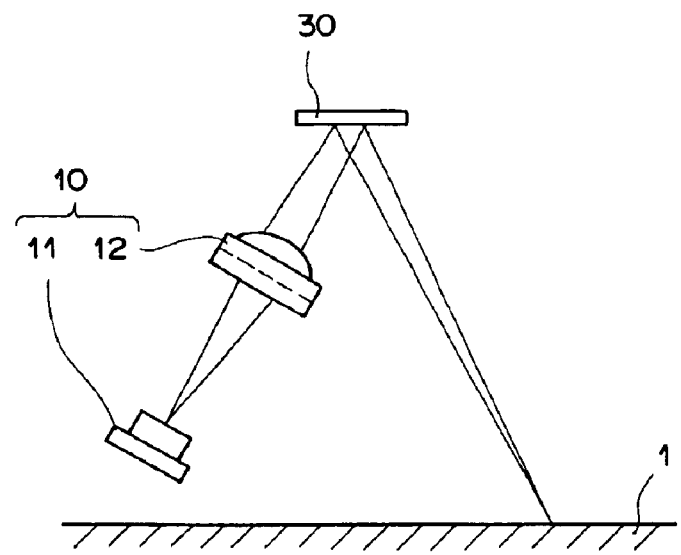
FIG. 5 is a view showing the stimulating light reflected by a reflecting mirror to impinge upon the stimulable phosphor sheet.

The overall size of the radiation image read-out apparatus can be further reduced by inserting a reflecting mirror 30 between the aspheric toric lenses 12 and the stimulable phosphor sheet 1 as shown in FIG. 5 so that the stimulating light radiated from the aspheric toric lenses 12 is reflected by the reflecting mirror 30 to impinge upon the stimulable phosphor sheet 1.

It is preferred that the stimulating light be caused to impinge upon the stimulable phosphor sheet 1 not normally but obliquely in order to suppress influence of return light.

It is possible to design an optical system having equivalent performance with a flat or toric first lens face.

The aspheric toric lens need not be of glass but may be of, for instance, resin.

In the radiation image read-out apparatuses of the embodiments described above, the aspheric toric surface of the aspheric toric lenses 12 contributes to correction of error in collecting the stimulating light in the line-like area P due to false spherical aberration and/or false curvature of field without increasing the optical path length, whereby the stimulating light can be precisely converged on a desired line-like area on the stimulable phosphor sheet without increasing the overall size of the apparatus.

What is claimed is:

1. A radiation image read-out apparatus for reading out a radiation image recorded on a stimulable phosphor sheet comprising a stimulating light projecting means which projects stimulating light emitted from a stimulating light source onto the stimulable phosphor sheet through a projecting optical system so that the stimulating light is collected in a line-like area of the stimulable phosphor sheet and a line sensor which detects stimulated emission emitted from the line-like area of the stimulable phosphor sheet upon exposure to the stimulating light, wherein the improvement comprises that the projecting optical system has an aspheric toric surface.

2. A radiation image read-out apparatus as defined in claim 1 in which the stimulating light projecting means comprises a plurality of pairs of the stimulating light source and the projecting optical system arranged along the longitudinal direction of said line-like area.

3. A radiation image read-out apparatus as defined in claim 2 in which the pairs of the stimulating light source and the projecting optical system are arranged so that line-like areas in which the stimulating light emitted from the respective stimulating light sources is collected through the corresponding projecting optical systems at least partly overlap each other.

4. A radiation read-out apparatus as defined in claim 2, wherein the stimulating light is formed as a continuous line in the line-like area.

5. A radiation read-out apparatus as defined in claim 4, wherein the pairs of the stimulating light source and projecting optical system are arranged so that the line-like areas in which the stimulating light emitted from the respective stimulating light sources is collected through the corresponding optical systems at least partially overlap each other at regions along said continuous line.

6. A radiation read-out apparatus as defined in claim 1, wherein the stimulating light is projected onto the stimulable phosphor sheet at an oblique angle.

7. A radiation read-out apparatus as defined in claim 1, wherein the projecting optical system comprises an aspheric toric lens.

8. A radiation read-out apparatus as defined in claim 7, wherein the aspheric toric lens comprises a resin material.

* * * * *